March 26, 1963 H. N. K. PATON Re. 25,362

DISCHARGEABLE BINS

Original Filed Dec. 7, 1956 2 Sheets-Sheet 1

INVENTOR
HAMILTON NEIL KING PATON
BY
Fetherstonhaugh & Co.
ATTORNEYS

DISCHARGEABLE BINS

Original Filed Dec. 7, 1956 2 Sheets-Sheet 2

INVENTOR
HAMILTON NEIL KING PATON
BY
Fetherstonhaugh & Co.
ATTORNEYS

United States Patent Office

Re. 25,362

Reissued Mar. 26, 1963

25,362

DISCHARGEABLE BINS

Hamilton Neil King Paton, Bellevue, Wash., assignor to Mervan & Co., Vancouver, British Columbia, Canada, a corporation of Canada Original No. 2,919,955, dated Jan. 5, 1960, Ser. No. 627,018, Dec. 7, 1956. Application for reissue Jan. 2, 1962, Ser. No. 164,433

16 Claims. (Cl. 302—29)

Figure 1:
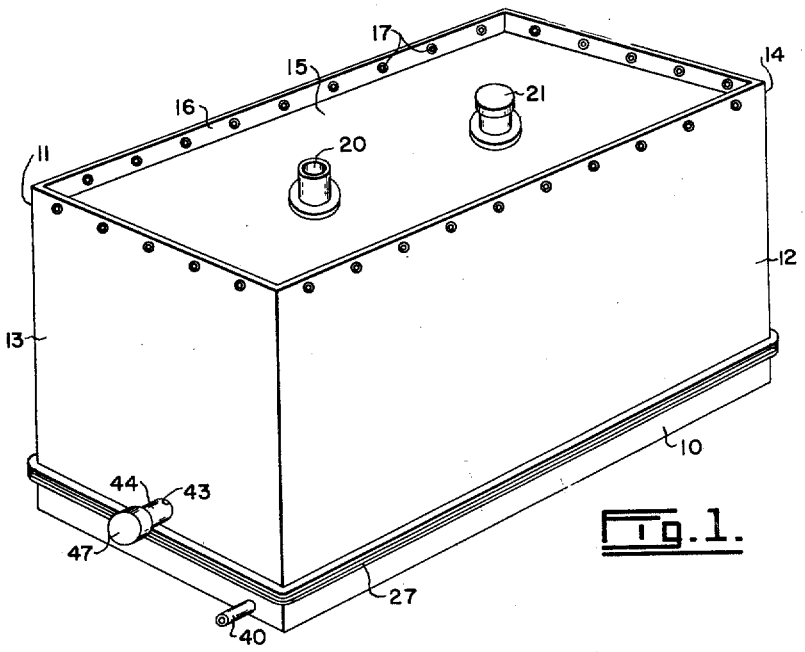

Matter enclosed in heavy brackets [ ] appears in the original patent but forms no part of this reissue specification; matter printed in italics indicates the additions made by reissue.

This invention relates to a dischargeable bin which is preferably collapsible, but which may also be constructed as a non-collapsible bin.

The term "bin" as used in this specification and the accompanying claims is intended to include a bag or other flexible or non-flexible container which may be used for any purpose whatsoever, such as for transporting or storing materials.

This bin may be used in transportation vehicles, such as railway cars and trucks, or in storage areas, such as warehouses. It is designed for materials in particle form, coarse or fine, such as flour, cement, sugar and the like. It protects the materials from moisture and contamination. The materials are directed into the bin through one or more openings in or near the top thereof, and they are removed through one or more discharge outlets at or near the bin bottom. The bin is provided with a floor arrangement which permits the materials to be aerated or fluidized during discharge, and it may be quickly and easily folded into a comparatively small bundle for storage or shipment.

The idea of fluidizing materials in particle form is not new, but the basic idea of the present invention is novel since it includes a dischargeable bin in the form of a collapsible bag which may be used to ship materials in particle form to desired destinations, and at said destinations the material in the bin is fluidized for ease of discharge, after which the bin may be collapsed and returned for another load. However, it may be used merely as a stationary bin for storing materials while protecting them from moisture, dirt, and the like.

A dischargeable bin according to the present invention comprises a holding chamber of any desired shape for small particle material, a gas-pervious bottom for the chamber raisable therein, and means for supplying gas such as air or inert gas, to the chamber through the pervious bottom thereof to fluidize small particle material therein. The holding chamber is preferably in the form of a collapsible bag formed of suitable material, such as nylon or canvas, treated to make it gas and moisture proof. The bin may rest on a horizontal floor, but it is preferable to rest it on a sloping floor, in which case the bin bottom slopes towards the discharge outlet, or it may be placed on a floor that may be raised to a sloping position. Actually, the bin has a gas-impervious bottom beneath the gas-pervious bottom, thereby forming a distributing chamber beneath the latter. Air under pressure is directed into this chamber, and it is forced through the gas-pervious bottom to fluidize small particle material in the holding chamber. If desired, suitable means may be provided around the edges of the gas-pervious bottom at the walls of the holding chamber for dislodging particle material at the point of junction of said floor and walls where there is a tendency for the material to accumulate during discharge.

Figure 2:
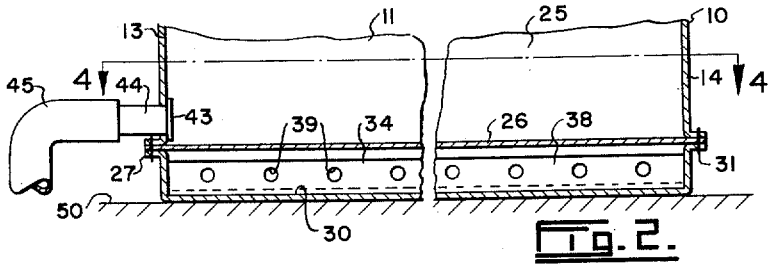
Figure 3:
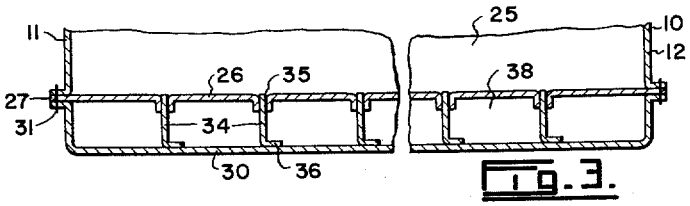
Figure 5:
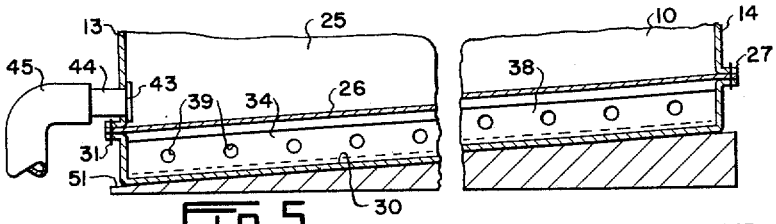
Figure 4:
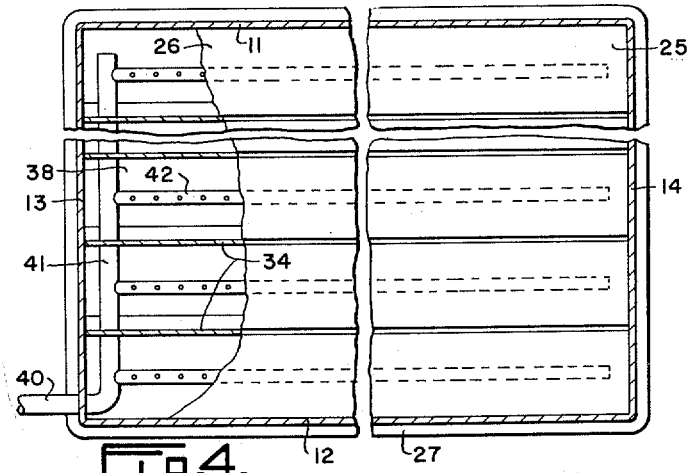
Figure 6:
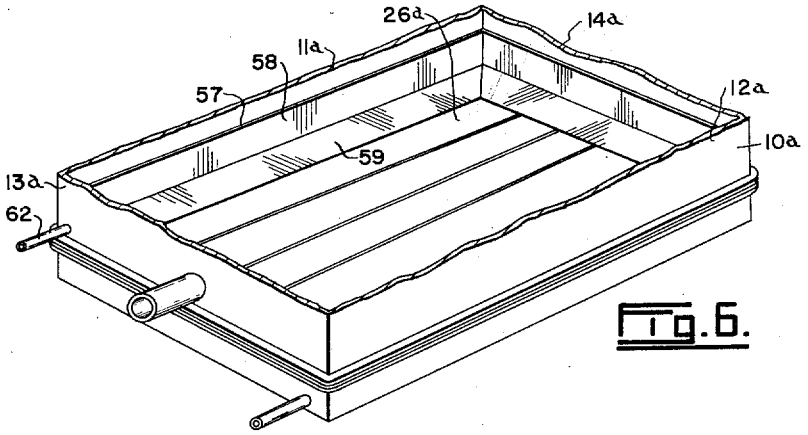
Figure 7:
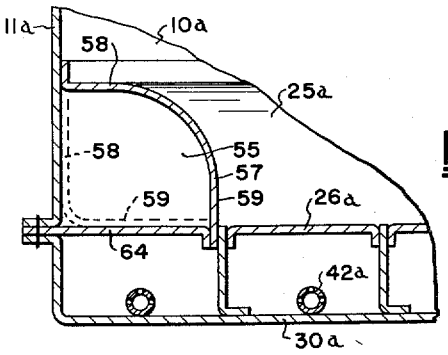

Examples of this invention are illustrated in the accompanying drawings, in which, FIGURE 1 is a perspective view of a dischargeable bin, FIGURE 2 is an enlarged longitudinal section through the bottom of the bin showing the gas-pervious bottom in its raised position during discharge, FIGURE 3 is an enlarged cross section through the bottom of the bin with the gas-pervious bottom in its raised position, FIGURE 4 is a horizontal section taken on the line 4—4 of FIGURE 2, FIGURE 5 is a view similar to FIGURE 2 showing the bin mounted on a sloping floor, FIGURE 6 is a perspective view of the bin with the top portion thereof cut away to show a part of the bin bottom, and including means for dislodging material from the bottoms of the bin walls during discharge, and FIGURE 7 is an enlarged section through the bottom of the bin of FIGURE 6 at a side wall thereof.

Referring to FIGURES 1 to 4 of the drawings, 10 is a dischargeable bin which is preferably formed of suitable flexible material, such as nylon or canvas, treated so as to be impervious to gas and moisture. The bin may be of any desired shape, the illustrated one being rectangular. This bin has a peripheral wall consisting of side walls 11 and 12 and end walls 13 and 14. The bin also has a top 15. When the bin is formed of flexible material, it usually requires support, and it is preferable to set it up in a storage space, such as a freight car, truck or storage room, having confining walls to prevent the side and end walls of the bin from bulging outwardly too far. The bin may be provided with an upwardly-extending flange 16 around the top thereof having grommets 17 therein which may fit over hooks, not shown, carried by the storage area walls. As the storage area itself does not form part of this invention, it has been omitted for the sake of clarity.

One or more filling openings 20, there being two shown in FIGURE 1, are provided in the top 15, each opening having a removable cover 21. If desired, these openings may be in a side or end wall near the top thereof.

The bin 10 forms a holding chamber 25, and it has a bottom 26 formed of gas-pervious material. This bottom is secured to the bottom edges of the side walls 11—12, and end walls 13—14 in any suitable manner, such as by stitching and/or adhesive as illustrated at 27. Another bottom 30 formed of *gas-impervious* [gas-pervious] pliable fluidizing material is provided below bottom 26. Bottom 30 has a flange strip 31 around its edges which is secured to bottom 26 of the bin walls at 27, as clearly shown in FIGURES 2 and 3.

As it is desired to keep bottom 26 from billowing up from bottom 30, it is desirable to provide a plurality of spaced webs 34 secured to bottom 26 at 35, and bottom 30 at 36. Bottom 26 may be formed of a single sheet of material, or it may be formed of a plurality of strips of material, as shown in FIGURE 3, in order that it may be firmly connected to the upper edges of webs 34. Similarly, bottom 30 may be formed of a plurality of strips in the same manner as bottom 26. If desired, instead of having webs, the two bottoms may be sewn and/or glued along the lines where the webs are.

The spaced bottoms 26 and 30 form a distributing chamber 38 therebetween, said chamber being divided into sections by webs 34, and if desired, the latter may have holes 39 therein in order to bring the chamber sections into communication with each other. Air or other gas may be supplied to the distributing chamber through pipe 40 which extends through end wall 13. This pipe may just open into the chamber, or as preferred, it may be connected to a flexible header 41, which, in turn, is connected to a flexible perforated pipe 42 extending longitudinally of each chamber section, see FIGURE 4. This distributes the gas throughout the chamber sections, and the header 41 and pipes 42 prevent the sections from being completely closed under load in order to make it possible to get air into said sections at the beginning of the discharging operation.

With the arrangement shown, air is directed to chamber 38 through a single pipe, but, if desired, several pipes may be provided for different sections of the chamber, in which case, the webs would not have holes 39 therein. With the latter arrangement, air may be directed to any single section or combination of sections of the distribution chamber. Furthermore, each of the several pipes may be connected to a perforated pipe in its chamber section.

If the perforated pipes are omitted, it is desirable to insert rope or other means in the chamber sections in order to keep parts of them open at all times for receiving the initial air supplied thereto.

A discharge outlet 43 is provided in wall 13 at the bottom 26 of the bin. It will be understood, however, that this discharge opening may be in any wall, or it may be through the bin bottom. A suitable pipe 46 extends outwardly from the discharge outlet. If the outlet is in the bin bottom, pipe 44 would extend through bottoms 26 and 30 of the bin. Material may be discharged through pipe 44 into a suitable receptacle, or into a conveyor pipe 45 connected to pipe 44, see FIGURE 2.

As previously stated, bin 10 is intended for materials in particle form, either coarse or fine. The materials are loaded into the bin through openings 20, and covers 21 are applied to seal the bin. A removable cover 47 is provided for pipe 44. When it is desired to discharge the material from the bin, one or both covers 21 and cover 47 are removed. When the bin is loaded, bottom 26 is flat against bottom 30. However, air is forced under pressure from a suitable connection, not shown, through pipe 40 and through header 41 and pipes 42 if used, into distribution chamber 38. This air passes upwardly through the pervious bottom 26 into holding chamber 25 to fluidize the material therein. This fluidized material flows out through outlet 43 and pipe 44. If desired, suction may be applied to pipe 44 through conveyor pipe or hose 45.

It will be noted that the air is supplied to the distributing chamber near the discharge outlet 43 of the holding chamber. With this arrangement, air is first directed through the fluidizer bottom 26 near the outlet. The reason for this is that when the outlet is opened, the particle material flows through said outlet under gravity. The load in the fluidizing bottom lessens at this point and the air, taking the course of least resistance, flows through this part of the fluidizing bottom. As the material continues to flow through the outlet, the air passes through an ever-enlarging portion of the fluidizing bottom until it is passing through all of said bottom.

Once bin 10 is emptied, it may be folded up for storage or for shipment. This collapsible bin is particularly useful for shipping materials in particle form, such as flour, cement or sugar, from one point to another. When the bin is emptied, it is folded into a compact bundle and returned to the point of origin for another load.

In FIGURE 2, the bin 10 is resting on a horizontal floor 50, while in FIGURE 5 it rests on a sloping floor 51. The bin is placed on the latter floor so that the bottom 26 slopes towards the discharge outlet 43. If the bin is designed particularly to rest on a sloping floor, it may be so constructed that the bottoms 26 and 30 slope relative to the walls and top of the bin. A better discharge of the material is obtained when the bottom 26 slopes towards the discharge outlet.

In FIGURES 6 and 7, the dischargeable bin 10a includes means for dislodging particle material from the corners formed by the side and end walls and the gas-pervious bottom 26a. For this purpose, an auxiliary chamber 55 is provided along the lower edges of side walls 11a and 12a and end wall 14a. This chamber is formed by a low wall consisting of a piece of flexible material 57, such as canvas or nylon, which is L-shaped when the bag is filled. This wall or piece has a vertical section 58 and a horizontal section 59 as shown in full lines in FIGURE 6, and dotted lines in FIGURE 7. Air or other gas may be directed into chamber 55 through a pipe 62 which extends into said chamber through one of the walls of the bin.

Bin 10a is unloaded in the manner described above. However, when most of the material has been discharged from the bin, air is directed into auxiliary chamber 55. This causes the wall 57 to blow out away from the bin wall and the bottom 26a, as shown in FIGURE 7. If desired, both sections 58 and 59 may be air-impervious, or either or both of them may be air-pervious. Furthermore, the section 64 of the bin bottom 26a which is located beneath wall 57 may be formed of gas-impervious material in order that chamber 55 may be inflated independently of the distributing chamber 38a.

This inflation of auxiliary chamber 55 dislodges any material that may have accumulated around the bottoms of the walls of the bin and directs it towards the centre of the fluidizing bottom where it is fluidized and, consequently, discharged through outlet 43.

The apparatus described above indicates an integral part of this invention, and that is a method of discharging particle material from a bin having a bottom.

This method consists of providing the bin with a gas-pervious fluidizing bottom above the bin bottom which collapses against the latter when said bin is loaded with small particle material and a discharge outlet at the fluidizing bottom, and directing a gas through the fluidizing bottom into the bin near the outlet thereof to fluidize the material near said outlet to cause it to flow through the latter. This flow of material from the area being fluidized causes some material from above the adjacent fluidizing bottom area to flow into said fluidization area. As a result of this, the gas is directed through a gradually enlarging area of the fluidizing bottom to increase the area of fluidization of the material to cause material to flow from said increasing area through the outlet until gas is passing through substantially the entire area. This empties the bin without having to fluidize the material under full load.

This method will be apparent from an examiantion of FIGURES 1 to 5. When bin 10 is filled, the gas-pervious bottom 26 collapses against bottom 30 under the load. When discharge outlet 43 is opened, some of the particle material runs out of it under the action of gravity. When air is directed between the two bottoms near the outlet, it passes through the fluidizing bottom near said outlet since that is where the resistance to its flow is least. This fluidizes the particle material in that area and causes it to flow out through the outlet. As said material moves out of the bin, material from the surrounding area flows into the fluidization area, allowing the air to flow through a gradually enlarging area of the fluidizing bottom. This action continues until air is passing through susbtantially the entire fluidizing bottom, and this empties the bin.

The advantage resulting from this method and the apparatus for carrying it out is that you never have to lift the entire load in order to start material flowing by the fluidizing action.

What I claim as my invention is:

1. A dischargeable bin for materials in small particle form, comprising a holding chamber in the form of a collapsible bag formed of flexible material for small particle material, a gas-impervous flexible bottom for the bag, a gas-pervious flexible fluidizing bottom secured at edges thereof to the bag and lying over the impervious bottom and normally collapsed against the latter, said bottoms forming a normally-collapsed distributing chamber therebetween, a discharge outlet for the chamber at the pervious bottom thereof, and means for directing gas into the distributing chamber, said gas passing through the pervious bottom to fluidize small particle material in the holding chamber to assist the flow of said material through the discharge outlet.

2. A dischargeable bin or materials in small particle form, comprising holding chamber in the form of a gas and moisture proof collapsible bag formed of flexible material for small particle material, a gas- and moisture-impervious flexible bottom for the bag, a gas-pervious flexible fluidizing bottom secured at edges thereof to the bag and lying over the impervious bottom normally collapsed against the latter, said bottoms forming a normally-collapsed distributing chamber therebetween, a filler opening at the top of the chamber, removable means for closing said opening, a discharge outlet for the chamber at the pervious bottom thereof, removable means for closing the outlet, and means for directing gas into the distributing chamber, said gas passing through the pervious bottom to fluidize small particle material in the holding chamber to assist the flow of said material through the discharge outlet.

3. A dischargeable bin for materials in small particle form comprising a holding chamber for small particle material, a gas-pervious flexible fluidizing bottom for the chamber, a discharge outlet for the chamber at the bottom thereof, means for supplying gas to the chamber through the pervious bottom thereof to fluidize small particle material therein, a low flexible wall formed of gas-pervious material secured to and normally lying against the holding chamber wall and the pervious bottom at least part way around said holding chamber, said low wall forming an auxiliary chamber over the pervious bottom at the holding chamber wall, and means for directing gas into the auxiliary chamber to blow the low wall away from the holding chamber wall and the pervious bottom to dislodge material from around the bottoms of the holding chamber walls.

4. A dischargeable bin for materials in small particle form, comprising a holding chamber for small particle material and having a confining wall, a gas-impervious flexible bottom for the chamber, a gas-pervious flexible fluidizing bottom secured at edges thereof to the confining wall and lying over the impervious bottom normally collapsed against the latter, said bottoms forming a normally-collapsed distributing chamber therebetween, a discharge outlet for the chamber at the pervious bottom thereof, means for directing gas into the distributing chamber, said gas passing through the pervious bottom to fluidize small particle material in the holding chamber to assist the flow of said material through the discharge outlet, a low flexible wall secured to and normally lying against the holding chamber confining wall and the pervious bottom at least part way around said holding chamber, said low wall forming an auxiliary chamber over the pervious bottom and the holding chamber wall, and means for directing gas into the auxiliary chamber to blow the low wall away from the holding chamber wall and the pervious bottom to dislodge material from around the bottoms of the holding chamber walls.

5. A dischargeable bin for materials in small particle form, comprising a holding chamber in the form of a gas and moisture proof collapsible bag for small particle material, a gas- and moisture-impervious flexible bottom for the bag, a gas-pervious flexible fluidizing bottom secured at edges thereof to the bag and lying over the impervious bottom normally collapsed against the latter, said bottoms forming a normally-collapsed distributing chamber therebetween, a filler opening at the top of the chamber, removable means for closing said opening, a discharge outlet for the chamber at the pervious bottom thereof, removable means for closing the outlet, means for directing gas into the distributing chamber, said gas passing through the pervious bottom to fluidize small particle material in the holding chamber to assist the flow of said material through the discharge outlet, a low flexible wall secured to and normally lying against the holding chamber wall and the pervious bottom at least part way around said holding chamber, said low wall forming an auxiliary chamber over the pervious bottom and the holding chamber wall, and means for directing gas into the auxiliary chamber to blow the low wall away from the holding chamber wall and the pervious bottom to dislodge material from around the bottoms of the holding chamber walls.

6. A dischargeable bin for materials in small particle form, comprising a holding chamber for small particle material, a gas-impervious bottom for the bin, a gas-pervious pliable fluidizing bottom for the chamber over the impervious bottom normally collapsed against the latter, said bottoms forming a normally-collapsed distributing chamber therebetween, a plurality of spaced collapsible webs connected along edges thereof to the two bottoms dividing the distributing chamber into sections and preventing the pliable pervious bottom from billowing away from the impervious bottom, a discharge outlet for the chamber at the pervious bottom thereof, and means for directing gas into the distributing chamber sections, said gas passing through the pervious bottom to fluidize small particle material in the holding chamber to assist the flow of said material through the discharge outlet.

7. A dischargeable bin as claimed in claim 6 including means in each section of the distributing chamber for preventing the pervious bottom from being completely pressed against the impervious bottom under the load of material in the holding chamber and forming an air passage therebetween when in collapsed condition.

8. A dischargeable bin for materials in small particle form, comprising a holding chamber for small particle material, a gas-impervious bottom for the bin, a gas-pervious pliable fluidizing bottom for the chamber over the impervious bottom normally collapsed against the latter, said bottoms forming a normally-collapsed distributing chamber therebetween, a plurality of spaced collapsible webs connected along edges thereof to the two bottoms dividing the distributing chamber into sections and preventing the pervious bottom from billowing away from the impervious bottom, a discharge outlet for the chamber at the pervious bottom thereof, means for directing gas into the distributing chamber, said gas passing through the pervious bottom to fluidize small particle material in the holding chamber to assist the flow of said material through the discharge outlet, a low flexible wall secured to and normally lying against the holding chamber wall and the pervious bottom at least part way around said holding chamber, said low wall forming an auxiliary chamber over the pervious bottom at the holding chamber wall, and means for directing gas into the auxiliary chamber to blow the low wall away from the holding chamber wall and the pervious bottom to dislodge material from around the bottoms of the holding chamber walls.

9. A dischargeable bin for materials in small particle form, comprising a holding chamber for small particle material and having a confining wall, a gas-impervious bottom for the bin, a gas-pervious pliable fluidizing bottom for the chamber over the impervious bottom normally collapsed against the latter, said bottoms forming a normally-collapsed distributing chamber therebetween, means securing the edges of said bottoms to the confining walls of the holding chamber, means securing the pervious bottom to the impervious bottom at spaced intervals to prevent the former from billowing far from the latter without interfering with the collapsing of the pervious bottom against the impervious bottom, a discharge outlet for the chamber at the pervious bottom thereof, and means for directing gas into the distributing chamber sections, said gas passing through the pervious bottom to fluidize small particle material in the holding chamber to assist the flow of said material through the discharge outlet.

10. A dischargeable bin for materials in small particle form, comprising a holding chamber for small particle material and having a confining wall, a gas-impervious bottom for the bin, a gas-pervious pliable fluidizing bottom for the chamber over the impervious bottom normally-collapsed against the latter, said bottoms forming a normally-collapsed distributing chamber therebetween, means, securing the edges of said bottoms to the confining wall of the holding chamber, means securing the pervious bottom to the impervious bottom at spaced intervals to prevent the former from billowing far from the latter without interfering with the collapsing of the pervious bottom against the impervious bottom, means between the two botoms for preventing the pervious bottom from being completely pressed against the impervious bottom under the load of material in the holding chamber, a discharge outlet for the chamber at the pervious bottom thereof, and means for directing gas into the distributing chamber sections, said gas passing through the pervious bottom to fluidize small particle material in the holding chamber to assist the flow of said material through the discharge outlet.

11. A dischargeable bin for materials in small particle form, comprising a holding chamber in the form of a collapsible bag for small particle material, said bag having a peripheral wall, top and bottom formed of pliable gas-impervious material, a gas-pervious pliable fluidizing bottom for the chamber within the bag and secured to the peripheral wall of the latter above the bag bottom, said pervious bottom normally being collapsed against the impervious bottom, a discharge outlet for the chamber at the pervious bottom thereof, said bag and pervious bottoms forming a distributing chamber therebetween which is collapsed when the bag is loaded, and means for supplying gas to the distributing chamber near the discharge outlet of the holding chamber, said gas passing through the pervious bottom to fluidize small particle material on said pervious bottom to assist the flow of said material through the outlet, and said air separating the two bottoms as the load in the holding chamber lessens.

12. A dischargeable bin as claimed in claim 11 including flexible webs connected at spaced intervals to the pervious and impervious bottoms to prevent the former from billowing from the latter under action of gas in the distributing chamber as the load in the holding chamber lessens.

13. A dischargeable bin as claimed in claim 11 including means in the distributing chamber for preventing the pervious bottom from being completely pressed against the impervious bottom under the load of material in the holding chamber and forming an air passage therebetween when in collapsed condition.

14. A dischargeable bin as claimed in claim 4 in which the low flexible wall is formed of gas-pervious material.

*15. A dischargeable bin for materials in small particle form, comprising a holding chamber for small particle material, a gas-pervious fluidizing bottom for the chamber, a discharge outlet for the chamber at the bottom thereof, means for supplying gas to the chamber through the fluidizing bottom thereof to fluidize the small particle material therein, a low flexible wall alongside said gas-pervious fluidizing bottom and having a lower edge portion secured relative thereto and an upper edge portion secured relative to the holding chamber wall at least part way around said holding chamber, said low wall forming an auxiliary chamber between the low wall and the holding chamber wall, and means for supplying gas into such auxiliary chamber to blow the low wall away from the holding chamber wall and toward the gas-pervious fluidizing bottom to dislodge material from around the bottom of the holding chamber wall and shift it toward the gas-pervious fluidizing bottom.*

*16. A dischargeable bin for materials in small particle form, comprising a holding chamber for small particle material, a gas-pervious fluidizing bottom for the chamber spaced from an upright wall of the chamber, a discharge outlet for the chamber at the bottom thereof, means for supplying gas to the chamber through the fluidizing bottom thereof to fluidize small particle material therein, a flexible wall secured to and bridging between such upright holding chamber wall and said gas-pervious fluidizing bottom, and means for supplying gas beneath said flexible wall to billow said flexible wall upward and thereby dislodge material on such flexible wall and move it toward said gas-pervious fluidizing bottom.*

References Cited in the file of this patent or the original patent

UNITED STATES PATENTS

| | | |
|---|---|---|
| 1,759,983 | Houston | May 27, 1930 |
| 2,527,466 | Townsend | Oct. 24, 1950 |
| 2,693,890 | Bridge | Nov. 9, 1954 |
| 2,723,054 | Londen | Nov. 8, 1955 |
| 2,730,150 | Wunderwald | Jan. 10, 1956 |
| 2,792,262 | Hathorn | May 14, 1957 |
| 2,805,896 | Yellott | Sept. 10, 1957 |
| 2,805,897 | Yellott | Sept. 10, 1957 |

FOREIGN PATENTS

| | | |
|---|---|---|
| 927,437 | Germany | May 9, 1955 |
| 738,026 | Great Britain | Oct. 5, 1955 |